United States Patent [19]

Isaksson

[11] Patent Number: 5,110,332
[45] Date of Patent: May 5, 1992

[54] FILTER FOR FILTRATION OF PARTICLES FROM A HOT GAS FLOW

[75] Inventor: Juhani Isaksson, Karhula, Finland

[73] Assignee: A. Ahlstrom Corporation, Karhula, Finland

[21] Appl. No.: 680,194

[22] Filed: Apr. 3, 1991

[30] Foreign Application Priority Data

Apr. 6, 1990 [FI] Finland ................... 901747

[51] Int. Cl.⁵ ............................................. B01D 46/00
[52] U.S. Cl. ............................................ 55/378; 55/502
[58] Field of Search ................. 55/378, 379, 341.2, 55/302, 502

[56] References Cited

U.S. PATENT DOCUMENTS

| | | | |
|---|---|---|---|
| 3,170,777 | 2/1965 | Held | 55/379 |
| 3,716,971 | 2/1973 | Reinauer | 55/302 |
| 4,324,407 | 4/1982 | Upham et al. | 277/27 |
| 4,735,638 | 4/1988 | Ciliberti et al. | 55/302 |
| 4,838,581 | 6/1989 | Oda et al. | 285/47 |
| 4,885,014 | 12/1989 | Reihardt et al. | 55/484 |
| 4,960,448 | 10/1990 | Zievers | 55/302 |

FOREIGN PATENT DOCUMENTS 1314143  4/1973  United Kingdom ................... 55/378

Primary Examiner—Bernard Nozick
Attorney, Agent, or Firm—Nixon & Vanderhye

[57] ABSTRACT

A filter for filtration of particles from a hot gas flow. The filter has a filter chamber, in which a plurality of tubular filter elements and at least one support plate (provided with apertures for receipt of the filter elements) are disposed. A slot between the support plate and each filter element is sealed by disposing at least two seals which have the same diameter as the slot, and engage both the support plate and tubular filter. The seals preferably are flexible in the same way as a piston ring.

20 Claims, 5 Drawing Sheets

FILTER FOR FILTRATION OF PARTICLES FROM A HOT GAS FLOW

BACKGROUND AND SUMMARY OF THE INVENTION

The present invention relates to a filter for filtration of particles from a hot gas flow. The filter comprises a filter chamber, which is provided with a plurality of filter elements and at least one support and/or tube plate. The support and/or tube plate has apertures for the filter elements and it divides the filter chamber into at least two separate sections. The invention is especially suitable for filters in which filter tubes serve as filter elements.

Combustion and gasification methods presently used require reliable particle separators, which are capable of efficiently separating particles from hot flue gases or combustion gases. Especially, the hot gases produced in combustion or gasification taking place in a circulating fluidized bed reactor contain large quantities of particles, ash, bed material, unburned fuel, absorbents etc. In these conditions, the particle separator has to endure both heat and abrasion.

In modern, combined gas and steam turbine power plants, where gases are expanded in a gas turbine, efficient gas purification prior to the turbine is of crucial importance for steady operation of the turbine. Particles contained in hot gas considerably add to the corrosion and wear of the turbine vanes.

Today, environmental aspects also must be taken into consideration, i.e. to minimize the emissions of particles in all processes emitting gas into the environment.

Various particle separators, such as vertical cyclones, horizontal cyclones and different filters are used for purification of hot gases. During the last few years, heat resistant filters permeable to gases have proved to be good alternatives to conventional hot gas cyclones. Cyclones require space for both the cyclone itself and the support arrangements thereof, whereas filters are simple and require little space. Filters manufactured from porous special metals or ceramic material endure very high temperatures and, unlike cyclones, they do not require cooling or refractory heat insulations. In pressurized processes, the filters are readily connected to pressurized combustion or gasification systems.

In filters, particles gradually accumulate on the surface of the porous material and, consequently, the filter has to be cleaned every now and then. As a large amount of particles accumulates on the filter surface, a great pressure difference is needed between both sides of the filter for leading the gas therethrough. The filters may be cleaned by shaking if the filter material stands such treatment or, for example, by back-blowing clean gas through the filter so that the particles accumulated on the filter will be disengaged.

The great pressure difference between both sides of the filter, needed for leading the gas therethrough, results in that gas tends to pass from the side of the higher pressure, i.e., the inlet side for dirty gas, to the side of the lower pressure, i.e. the outlet side for clean gas, also via routes other than through the filter, for example, through the slots between the filter tube and the support plate. During the back-blow, i.e., the purification stage, the gas pressure is correspondingly raised momentarily higher on the clean gas side. It is important that the purification gas really passes through the filter and cleans it, not leaking through any other places that are not tight.

In a vertical filter, the filter tubes are normally attached at their upper ends, for example, via flanged joints to a horizontal support plate. The horizontal support plate also divides the filter chamber into two sections, one for dirty and the other for clean gas. The support plate has apertures through which the filter tubes run and to which they are attached. The slot between the filter tube and the aperture is sealed as tightly as possible so as to prevent dirty gas from escaping into a space for clean gas.

The slot between the filter tube and the support plate is designed to be sealed, e.g., by clamping the tubes tightly to the support plates. However, sealing is often very difficult because there are a great number of adjacent tubes disposed close together in the hot gas space, not leaving much space for clamping means and also making the filter structure very complicated.

It has also been attempted to seal the slot between the tubes and the apertures, for example, so that the aperture in the support plate tapers downwardly and the upper end of the filter tube is expanded upwardly in a curved manner, the tapered aperture thereby supporting the filter tube at the upper end thereof, at the same time sealing the slot between the tube and the aperture. German patent specification 35 15 365 discloses a gas filter of this type.

FI patent application 892368 suggests that the apertures in the support plate may be equipped with an inwardly directed flange, and the upper end of the filter tube correspondingly with an outwardly directed shoulder, and the space between the flange and the shoulder with a seal for sealing the slot between the tube walls and the support plate. The filter tube may be clamped by a press plate or a spring against the support plate. The filter tube may also be pressed against the support plate by placing a sufficiently heavy steel weight on the tube, such weight holding the tube tightly against the support plate. Use of weights remarkably adds to the load on the support plate.

In the above described known arrangements, the upper end of the filter tube has to be so shaped as to make its diameter larger than the diameter of the aperture in a corresponding plate, which places certain restrictions on the use of such arrangement. Vertical filters are often tall, which means that, besides the topmost support plate, the filter tubes usually require two or three additional support plates or possibly, for other reasons, the filter chamber has to be divided by tube plates into a plurality of spaces for clean gas. The slots between the apertures of these additional plates and the filter tubes also must be sealed.

It is much more difficult to install filter tubes if the filter is provided with several tube plates, especially, if the diameter of the filter tubes is not the same along the whole length thereof, but the tubes have shoulders for supporting said tubes or for sealing them with the tube plates. If the apertures for the tubes are equal in diameter in all support and tube plates, the tubes with shoulders have to be installed in the tube plates from the side, each tube from a level of its own. In this case, much installation room is required for transferring long filter tubes and for threading them into their respective tube plates.

It is possible—though hardly advantageous—to use filter tubes of different diameters on different levels, and correspondingly apertures of different diameters in different support or tube plates so that the tubes, including their shoulders, to be disposed on lower levels go through the upper apertures without being caught by the edges of the apertures until they have reached the correct level. In this way, all filter tubes to be disposed in the lower section go through the apertures in the upper plates until they reach their own level and will be stopped by the shoulders in the smaller apertures. In this manner, the filter area is, however, unnecessarily reduced in the lower section of the filter, because the filter tubes with smaller diameters also have a smaller filter area. Furthermore, idle space remains between the filter tubes in the lower section of the filter because the spacing of tubes is the same on both the topmost and the lowermost levels.

Fixed, tight joints between the filter tubes and the support or tube plates cannot be used in hot conditions due to unequal heat expansion of tubes and plates. The joint between the tubes and the plates has to be able to expand and contract. Different arrangements have therefore been suggested in which each tube is connected to the support or tube plate by means of bellows. However, the bellows easily wear, especially in hot conditions. U.S. Pat. No. 4,838,581 teaches a complicated arrangement in which an insulating layer is disposed between a hot filter tube and the bellows in order to protect the bellows from heat.

The present invention seeks to provide an improved filter, in which the drawbacks of the prior art have been minimized and, especially, a filter structure with simple and reliable sealing between the filter tube and the edge wall means defining the apertures in the support plate so as to prevent gas from flowing through the apertures. The invention enables use of seals made from simple, heat resistant materials, and the invention provides a joint between each filter tube and its support or tube plate, which enables movement of the tube caused by heat expansion, or the like. The invention also enables simple installation of the filter tubes and minimizes the risk of damage to the filter tubes during installation, and provides a filter structure in which all filter tubes may be installed from the same level. To achieve the above advantages, it is a desirable feature of the invention that the slot between the apertures in the support and/or tube plate and the filter elements extending therethrough is sealed by inserting at least two seals at a short distance from each other in the slot, the seals having substantially the same shape as the slot. The invention relates, e.g., to a filter with a plurality of adjacent filter tubes attached to circular apertures in the support plate, thereby forming annular slots between the aperture and the tube, the slots being sealed mainly by seals which are circular in shape. The seals are preferably made of elements in the shape of rings (e.g. a piston ring), each element being provided with a slot to give flexibility to the elements. Flexible elements may simply be shrunk, e.g., around the filter tube or may be clamped to the circumference of the aperture in the support or tube plate.

In order to attach the seal to the filter tube or to the aperture, it is preferable to make a groove in the tube or the surface of the aperture and to partly insert the seal in the groove.

The groove may be milled, e.g., directly in the surface of a ceramic filter tube or in the surface of the aperture in the plate. Technically, it may be more advantageous to fix a sleeve at the end of the tube or in the aperture in the plate and to make the grooves in the sleeve. The arrangement with sleeves may in some cases provide a better sealing result. A sleeve attached to the upper end of the tube may be provided with a flange, by means of which the tube is attached to the uppermost support plate.

The filter tubes may be so-called flow-through tubes, open at both ends thereof. Dirty gas is introduced into each filter tube from the upper end thereof. Clean gas passes through the filter formed by the tube wall and the particles separated from the gas partly stick to the filter, and partly flow downwardly inside the tube and out of the filter. The flow-through tubes may be supported from either their upper or their lower ends. Preferably, the tubes are attached to the uppermost support plate by means of a flanged joint or the like.

The filters may also be closed at their lower ends, whereby the dirty gas is introduced into a gas space outside the filter tubes, and the clean gas passes through the filter surface into the tubes and further out of the filter. The particles remain on the outer surface of the filter tubes and come off the surface by themselves or by means of, back-blowing, and then may be removed from the filter.

The efficiency of the seal between the tubes and the plate may be improved by leading sealing or extrusion gas, for example, air or other clean gas, into the slot between the tube and the plate. The extrusion gas fed into the slot prevents, by means of overpressure formed thereby, dirty gas from flowing from a volume of dirty gas through the slot into the volume of clean gas. The same gas, e.g. air, as is used for cooling the support or tube plates may serve as a sealing gas. The plate may be simply provided with gas feed openings close to the slot to be sealed, through which openings gas continuously flows into the slot.

In accordance with an arrangement according to the invention, gas may be fed into grooves formed in the surface of the apertures in the plate, e.g. to the backside of the sealing ring so that the gas fed thereinto presses the sealing against the wall of the filter tube thereby increasing the sealing efficiency.

The sealing arrangement according to the invention enables use of filter tubes which are substantially of the same thickness throughout the whole length thereof without causing any deterioration of the sealing efficiency. Filter tubes of the same thickness throughout the whole length thereof are easy to install because all tubes may be brought into the filter through one installation opening, for example, in the upper or lower section of the filter. Therefore, separate, large installation openings for the tubes are unnecessary at the filter sides.

The sealing may be formed simply by using two or more simple sealing rings. Neither a bellows nor other complicated, space consuming, heavy and expensive seals are needed. For example, seals in the shape of a piston ring are simple to clamp on the tubes or in the apertures.

The sealing according to the invention enables movement of filter tubes caused by heat expansion in the aperture of the support plate, and is light, thereby not significantly adding to the load on the support plate.

DETAILED DESCRIPTION OF THE DRAWINGS

Figure 1:
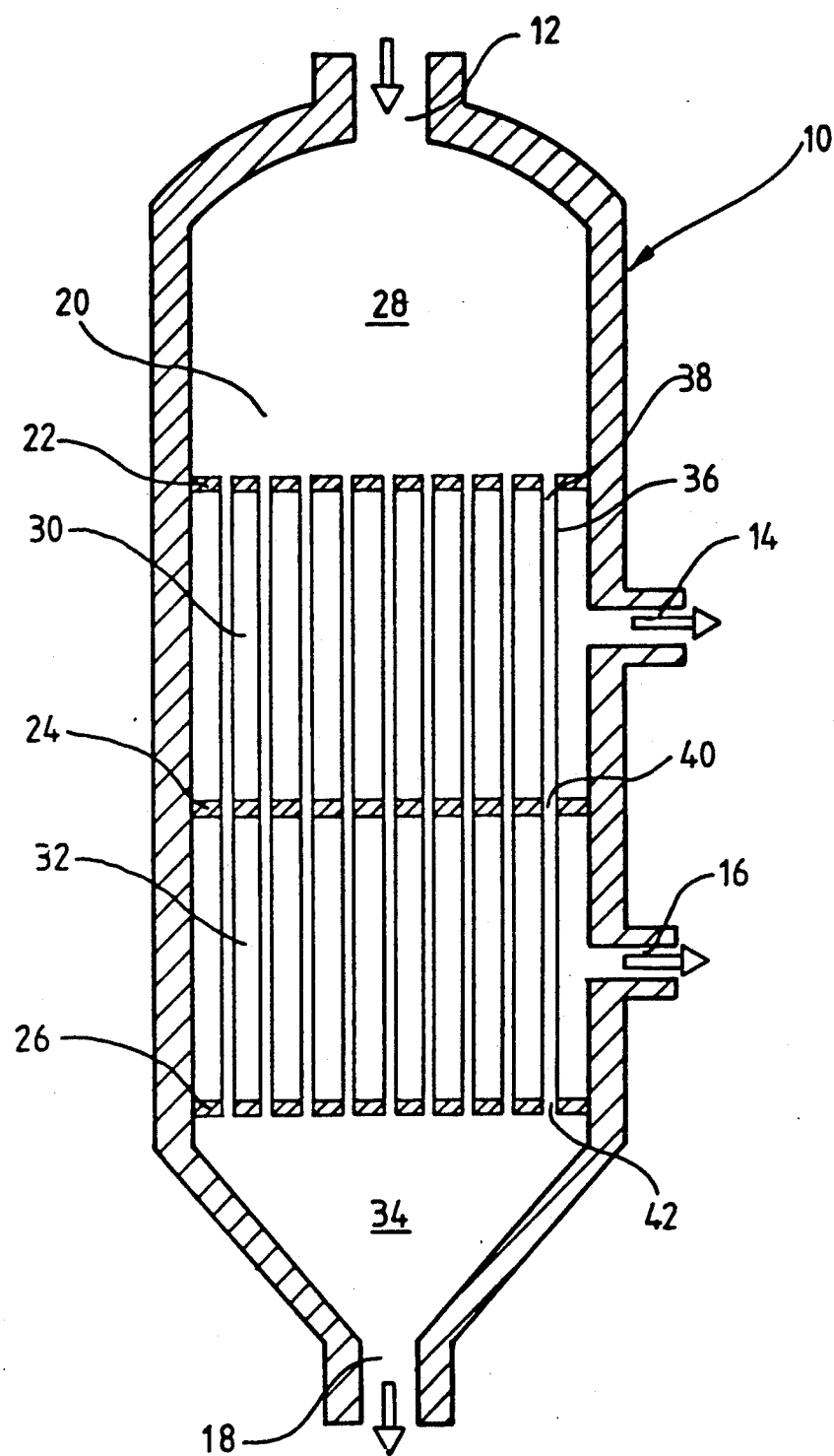
FIG. 1 is a schematic vertical section of a filter according to the invention.

FIG. 1 shows a filter comprising a vessel 10 provided with an inlet 12 for dirty gas, outlets 14 and 16 for clean gas, and an outlet 18 for particles separated from the gas.

A filter chamber 20 is divided by three tube plates 22, 24 and 26 into a chamber 28 for dirty gas, chambers 30 and 32 for clean gas, and a receiving chamber 34 for particles. A great number of elongated tubular (e.g. circular cross-section) filter elements (filter tubes) 36 are disposed between the tube plates 22, 24, 26. The uppermost tube plate 22, which also serves as a support plate for the filter tubes 36, is provided with edge means defining apertures 38 for filter tubes 36 to which edge means the filter tubes 36 are attached at their upper ends. The two lowermost tube plates 24 and 26 are correspondingly provided with edge means defining apertures 40 and 42 for filter tubes 36, which apertures 40, 42 are concentric with the apertures 38 formed in the uppermost plate 22 so that the filter tubes 36 may be arranged to extend from the uppermost plate 22 through the tube middle plate 24 to the lowermost tube plate 26. The filter tubes 36 connect the volume 28 for dirty gas to the receiving space 34 for the particles.

The gas to be cleaned is introduced via inlet 12 into the chamber 28 for dirty gas and further into the filter tubes 36. The filter tubes are manufactured from porous ceramic material or other heat resistant porous material. From the filter tubes, clean gas flows through the walls thereof into the chambers 30 and 32 for clean gas. The particles contained in the gases are separated therefrom onto the inner surface of the tubes, and typically flow, partly due to gravity, downwardly into the receiving chamber 34 for particles. The particles adhered to the tube 36 inner walls may be disengaged every now and then, for example, by back-blowing gas from the clean side of the filter tubes 36 to the dirty side thereof, whereby the particles flow downwardly into the receiving chamber of particles. Back-blowing is not shown in the drawings, but may be as illustrated in co-pending application serial no. 07/569,125 filed Aug. 17, 1990 (attorney docket 30-131).

Figure 2:
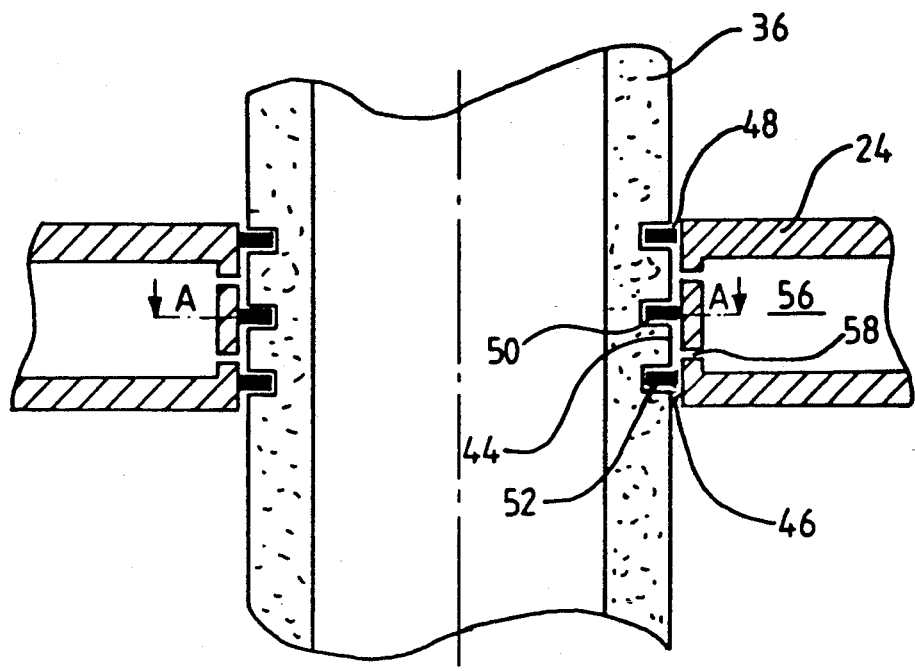
FIG. 2 is an enlargement of a section of the filter illustrated in FIG. 1, showing the filter tube sealing in an aperture of the support plate.
Figure 3:
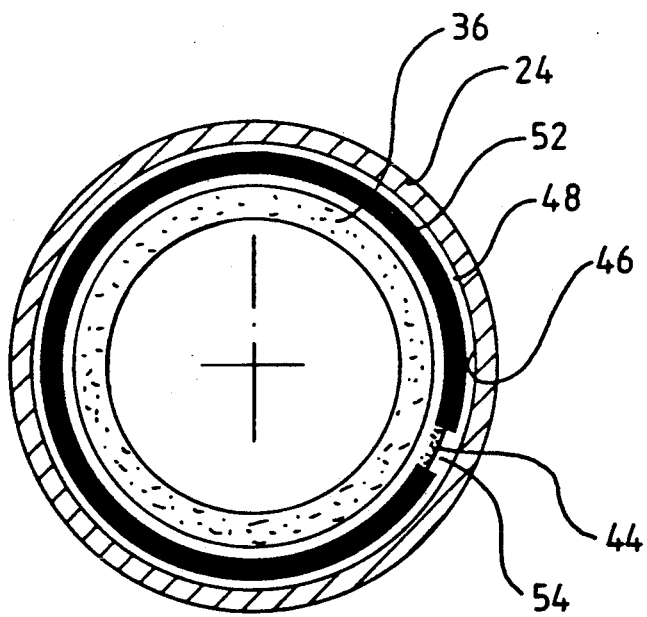
FIG. 3 illustrates the section of the filter, which section was shown in FIGURE. 2, taken along line A—A in the cross section.

FIGS. 2 and 3 are enlargements of the sealing of the slot between an outer wall 44 of the filter tube 36 and the edge wall 46 of an aperture 40 in the tube plate 24. Circular grooves 50 are formed on the circumference of the filter tube, on the wall 44 thereof, and sealing rings 52 are disposed in these grooves 50. The sealing rings 52 partly protrude from the grooves 50 so as to seal the slot between the filter tube 36 and the wall 46 of the aperture 40. The material of the sealing rings 52 may be metal, e.g., steel, or may be heat resistant ceramic fiber material. Steel sealings endure temperatures in excess of 100° C. The sealing rings 52 are each in the shape of a piston ring as shown in FIG. 3. Each ring 52 is provided with a slot 54, which gives the ring flexibility when it is installed around the filter tube. When, for example, three flexible sealing rings 52 are installed one on top of the other, as shown in the embodiment of FIG. 2, the sealing rings 52 are so arranged around the filter tube 36 that the slots 54 are arcuately spaced along the circumference of the filter tube 36.

The tube plates 22, 24, 26 are normally cooled using a cooling fluid means, such as a chamber 56 inside each plate 24, through which chamber 56 cooling gas or liquid passes. Such cooling fluid also cools the sealing elements (e.g. 52). The tube plate 24 is preferably cooled by air. For improving the sealing effect between the filter tube 36 and the tube plate 24, the wall of the tube plate 24 is provided with openings 58 wherethrough cooling gas is introduced into the slot 48 between the tube 36 and the plate 24. In the slot 48, the cooling gas forms a buffer zone between the gas chambers 30 and 32 disposed on both sides of the tube plate 24. The buffer zone insures sealing of the slot, so that no gas escapes from one chamber to the other.

Figure 4:
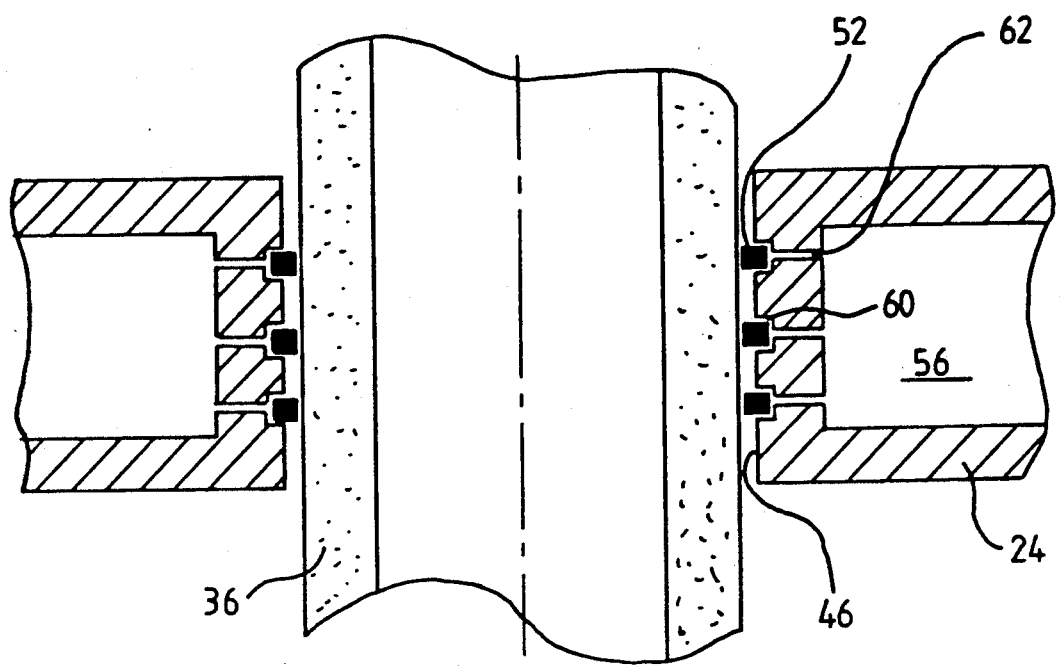
FIGS. 4-8 illustrate filter tube sealings in the aperture of the support plate in accordance with other embodiments of the invention.

FIG. 4 illustrates a second sealing arrangement according to the invention, in which the wall 46 of the tube plate is provided with grooves 60 in which the seals 52 are inserted. The wall of the tube plate 24 in the sealing grooves 60 is provided with openings 62 for conducting cooling gas from a cooling space 56 of the tube plate 24 into the slot 48 to be sealed. The gas extruding out of the cooling space 56 also biases the sealing ring 52 towards the filter tube 36, so that sealing action is improved.

Figure 5:
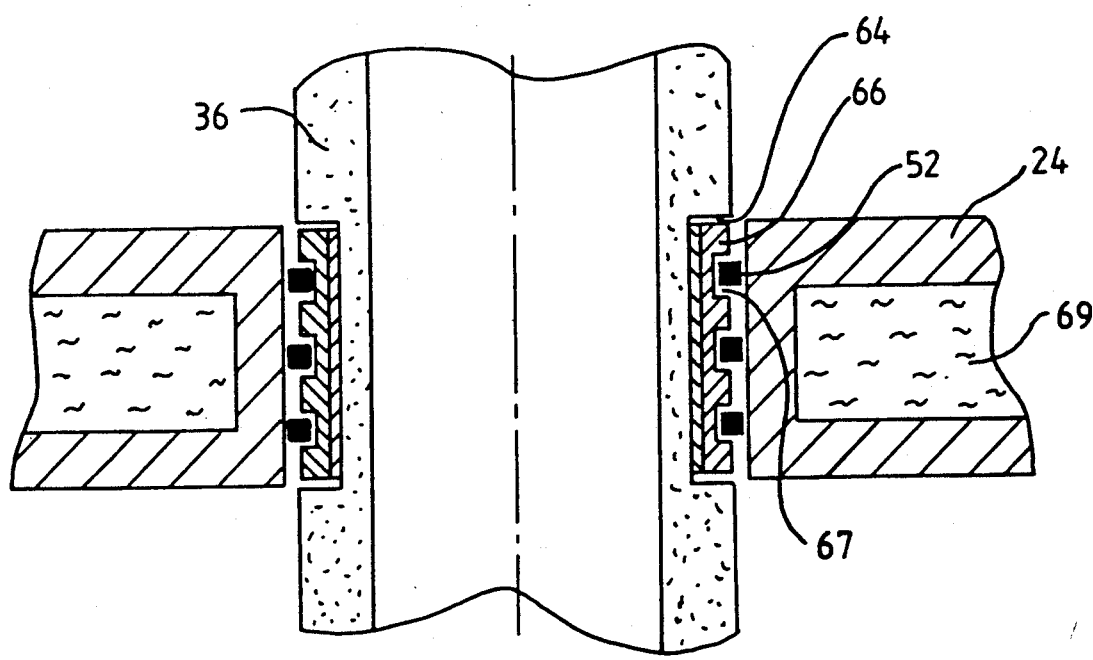

In some cases, it may be advantageous to support the structure of each filter tube 36 by means of a sleeve, which is well suited for supporting the sealing rings 52. FIG. 5 shows an embodiment of the invention in which a metal sleeve 66 is disposed in a wide groove 64 formed around the filter tube 36 on the level of the tube plate 24. Smaller grooves 67 are formed in the sleeve 66 surface, and the sealing rings 52 are inserted in these smaller grooves 67. In the embodiment of FIG. 5, the tube plate 24 is cooled by liquid 69.

Figure 6:
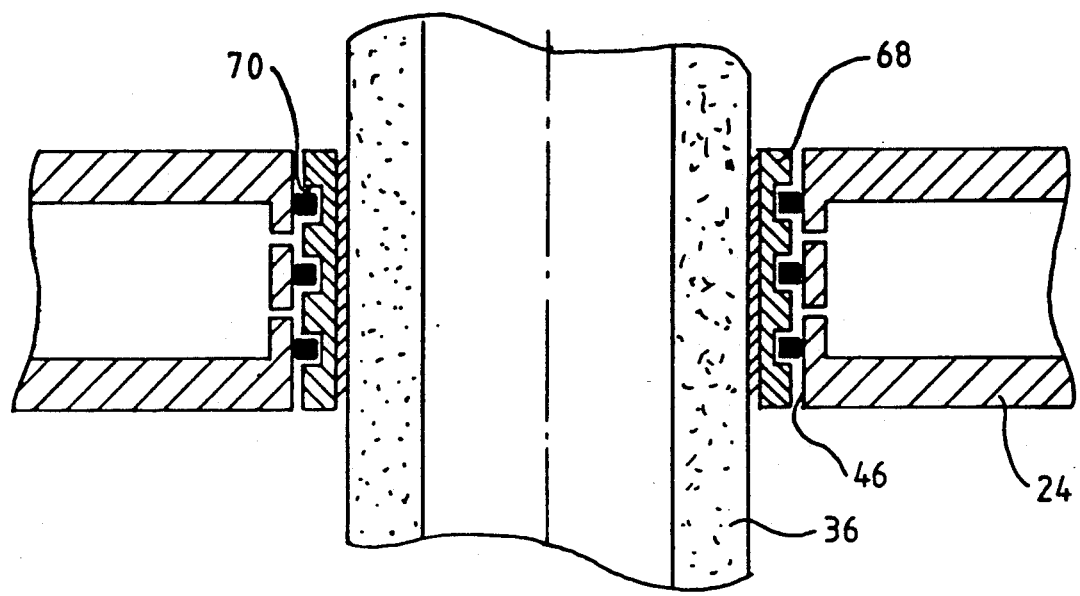

FIG. 6 shows an embodiment according to the invention, where the diameter of the filter tube 36 is smaller than the diameter of the aperture in the tube plate 24. A sleeve 68, the outer diameter of which substantially equals the diameter of the aperture defined by edge wall 46, is fixed around the tube 36. The sleeve 68 is provided with grooves 70 for the sealing rings 52. By means of the sleeve, it is thereby possible to seal a tube plate 24 against a tube 36 having a diameter which is "too small".

Figure 7:
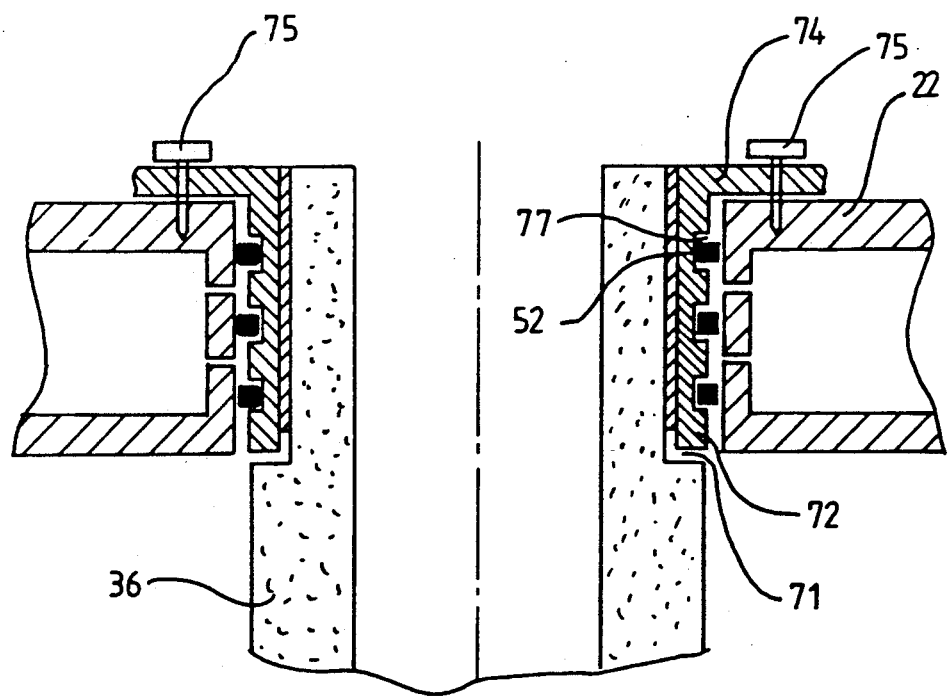

FIG. 7 shows sealing of the upper end of the filter tube 36 to the uppermost tube plate or support plate 22. The upper end of the tube 36 is provided with a wide groove 71, to which a sleeve 72 is attached, the width of the sleeve 72 being the same as that of the groove 71. At the upper end of the sleeve 72 is disposed a flange 74 which is bent outwardly and attached to the top surface of the support plate 22 by means of one or more fasteners 75. The vertical wall of the sleeve 72 is provided with grooves 77 in which sealing rings 52 are disposed.

Figure 8:
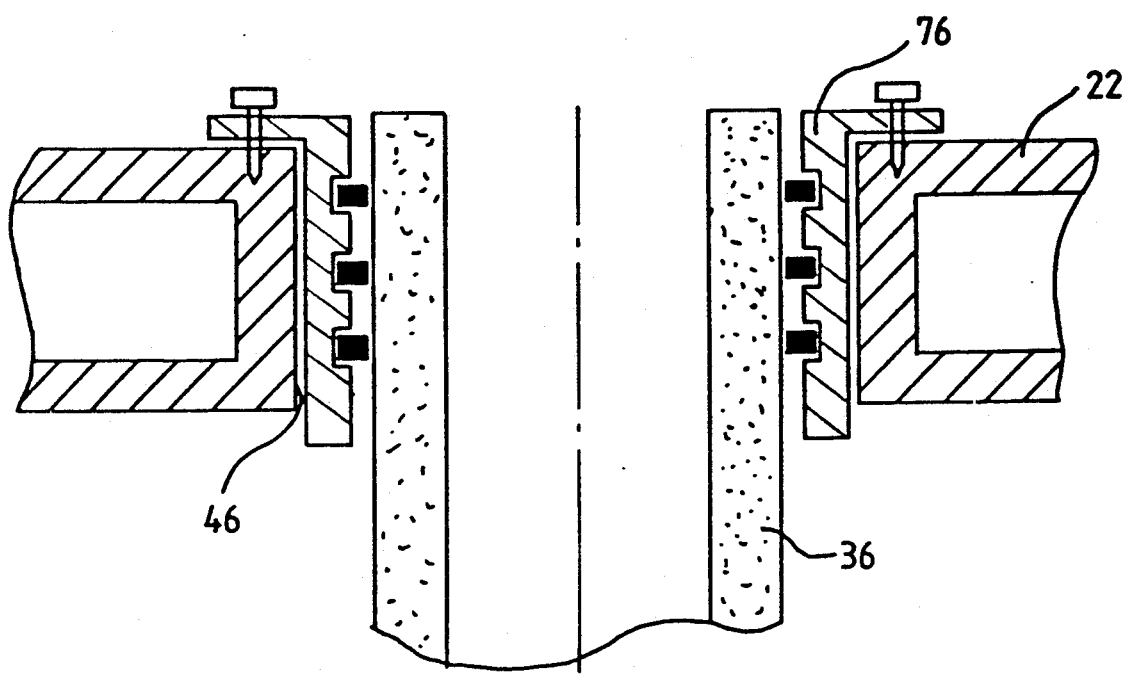

FIG. 8 shows an embodiment in which a flanged sleeve 76, similar to sleeve 74, is tightly fixed to the edge wall 46 of the aperture 40 in the support plate 22. The sleeve is provided with grooves in which sealing rings are inserted. In this case, the filter tube 36 is supported at the lower end thereof.

To seal the filter tube 36 to an aperture 40 of a support plate or tube plate 22, 24, 26, preferably two or more circular seals 52 are used. The number of seals 52 is dependent on the dimensions of the slot 48 to be sealed, the pressure difference between the chambers 28, 30, for example, and the characteristics of sealing material.

A sealing for tubes and tube plates according to the invention also is useful with filter tubes that are closed at one end thereof and are supported by a support plate, and in which the gases flow from the outside of the filter tubes to the inside thereof. In such filters, the slot between the support plate and the filter elements is sealed with a seal which is preferably flexible in the same way as a piston ring.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A filter for high temperature gases, comprising:
   a vessel having a dirty gas inlet, a separated particles outlet, and a clean gas outlet;
   a plurality of elongated rigid tubular filter elements having pores therein which allow the passage of high temperature gas therethrough, but filter out the majority of particles contained in the gas, the dirty gas inlet being provided on one side of the filter elements and the clean gas outlet being provided on the other side of the filter elements;
   at least one support plate mounted in said vessel having edge wall means defining therein for receipt of said rigid tubular filter elements, and separating said dirty gas inlet from said clean gas outlet;
   each said rigid tubular filter element and an associated edge wall means defining a slot therebetween; and
   means for sealing each said slot, said means comprising at least two distinct seal elements disposed in said slot and spaced a short distance from each other in the dimension of elongation of said rigid filter element, each seal operatively engaging both said rigid filter element and said edge wall means.

2. Apparatus as recited in claim 1 further comprising cooling fluid means associated with said support plate.

3. Apparatus as recited in claim 1 wherein said sealing means further comprises a grooved sleeve disposed in each slot and engaging one of said rigid filter element and said edge wall means, the grooves of said sleeve receiving said seal elements therein, and being spaced from each other in the dimension of elongation of said rigid tubular filter element.

4. Apparatus as recited in claim 3 wherein said rigid support plate support said filter elements at the tops thereof; and wherein said sleeves each have a flange at the top thereof for engaging the top of said support plate.

5. Apparatus as recited in claim 3 wherein said rigid tubular filter elements are circular cross section tubes, and said support plate apertures are circular in plan; and wherein said seal elements are flexible rings.

6. Apparatus as recited in claim 3 wherein said seal elements have the shape of piston rings.

7. Apparatus as recited in claim 1 wherein said seal elements have the shape of piston rings.

8. Apparatus as recited in claim 7 wherein each of said piston rings has a slot at a peripheral portion thereof, and wherein said plurality of piston rings, have the slots thereof staggered, so that they are circumferentially spaced around said rigid filter element.

9. Apparatus as recited in claim 1 wherein said rigid tubular filter elements are circular cross section ceramic tubes, and said support plate apertures are circular in plan; and wherein said seal elements are flexible rings.

10. Apparatus as recited in claim 9 wherein one of said filter element and edge wall means is grooved, and wherein said seal element rings are disposed in the grooves.

11. Apparatus as recited in claim 9 further comprising cooling fluid means associated with said support plate, said cooling fluid means directing fluid against said seal elements to enhance the sealing action thereof in addition to providing cooling action.

12. Apparatus as recited in claim 1 wherein the seal elements are flexible, and further comprising cooling fluid means associated with said support plate, said cooling fluid means directing fluid against said flexible seal elements to enhance the sealing action thereof in addition to providing cooling action.

13. Apparatus as recited in claim 12 wherein one of said rigid filter elements and edge wall means is grooved, and wherein said seal element are disposed in the grooves.

14. Apparatus as recited in claim 13 wherein said cooling fluid means directs cooling fluid into the grooves.

15. A filter elements assembly for filtering particles from high temperature gas, comprising:
    a plurality of elongated rigid tubular filter elements having pores therein which allow the passage of high temperature gas therethrough, but filter out the majority of particles contained in the gas;
    at least one support plate for supporting said rigid tubular filter elements so that the dimension of elongation thereof is substantially vertical, said plate having edge wall means defining apertures therein for receipt of said rigid tubular filter elements;
    each said rigid tubular filter element and an associated edge wall means defining a slot therebetween; and
    means for sealing each said slot, said means comprising at least two distinct seal element from each other in the dimension of elongation of said rigid filter element, each seal operatively engaging both said rigid filter element and said edge wall means.

16. An assembly as recited in claim 15 wherein the seal elements are flexible, and further comprising cooling fluid means associated with said support plate, said cooling fluid means directing fluid against said flexible seal elements to enhance the sealing action thereof in addition to providing cooling action.

17. An assembly as recited in claim 15 wherein said rigid sealing means further comprises a grooved sleeve disposed in each slot and engaging one of aid filter element and said edge wall means, the grooves of said sleeve receiving said seal elements therein, and being spaced from each other in the dimension of elongation of said rigid tubular filter element.

18. An assembly as recited in claim 17 wherein said support plate supports said rigid filter elements at the tops thereof; and wherein said sleeves efh have a flange at the top thereof for engaging the top of said support plate.

19. An assembly as recited in claim 15 wherein said seal elements have the shape of piston rings.

20. An assembly as recited in claim 19 wherein one of said rigid filter element and edge wall means is grooved, and wherein said seal element rings are disposed in the grooves.

* * * * *